(12) United States Patent
Thyamagondlu et al.

(10) Patent No.: US 12,407,652 B2
(45) Date of Patent: Sep. 2, 2025

(54) FIREWALLING COMMUNICATION PORTS IN A MULTI-PORT SYSTEM

(71) Applicant: Xilinx, Inc., San Jose, CA (US)

(72) Inventors: Chandrasekhar S. Thyamagondlu, Saratoga, CA (US); Akhil Krishnan, San Jose, CA (US); Darren Jue, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 355 days.

(21) Appl. No.: 18/185,634

(22) Filed: Mar. 17, 2023

(65) Prior Publication Data

US 2024/0314107 A1 Sep. 19, 2024

(51) Int. Cl.
*G06F 13/40* (2006.01)
*H04L 9/40* (2022.01)

(52) U.S. Cl.
CPC ...... *H04L 63/0245* (2013.01); *G06F 13/4027* (2013.01); *H04L 63/0209* (2013.01)

(58) Field of Classification Search
CPC .......... H04L 63/0245; H04L 63/0209
See application file for complete search history.

(56) References Cited

U.S. PATENT DOCUMENTS

| | | | | |
|---|---|---|---|---|
| 8,635,685 B2 * | 1/2014 | Conti | ...................... | G06F 21/74 726/2 |
| 8,650,422 B1 * | 2/2014 | Goolsby | ............... | G06F 1/3228 713/323 |
| 8,943,240 B1 | 1/2015 | Subramanian | | |
| 8,954,640 B1 | 2/2015 | Tam | | |
| 10,474,599 B1 | 11/2019 | Mohan | | |
| 10,802,995 B2 | 10/2020 | Singh et al. | | |
| 10,819,680 B1 * | 10/2020 | Santan | ................ | H04L 63/0209 |
| 11,232,053 B1 * | 1/2022 | Thyamagondlu | ....... | G06F 13/28 |
| 2022/0092010 A1 | 3/2022 | Thyamagondlu et al. | | |
| 2023/0126961 A1 * | 4/2023 | Leong | ..................... | G06F 21/72 713/171 |
| 2023/0244824 A1 * | 8/2023 | Moser | ..................... | G06F 21/71 726/21 |
| 2023/0319010 A1 * | 10/2023 | Schmid | ................. | H04L 63/108 726/9 |

FOREIGN PATENT DOCUMENTS

WO 2020023797 1/2020

* cited by examiner

*Primary Examiner* — Henry Tsai
*Assistant Examiner* — Christopher A Daley
(74) *Attorney, Agent, or Firm* — Kevin T. Cuenot

(57) ABSTRACT

Handling port resets in a multi-port system includes monitoring, using a plurality of firewall circuits, a plurality of controllers corresponding to different communication ports for a reset condition. The plurality of controllers are coupled to a direct memory access (DMA) system through a plurality of bridge circuits. A selected firewall circuit detects a reset condition on a selected controller coupled thereto. The selected controller is coupled to a selected bridge circuit of the plurality of bridge circuits. In response to detecting the reset condition, the selected firewall circuit implements a firewall operating mode. While operating in the firewall operating mode, the selected firewall circuit is configured to control operation of the selected bridge circuit thereby isolating the selected controller from the DMA system. Firewall operating mode of firewall circuits also may be initiated by a management processor in a proactive manner.

20 Claims, 5 Drawing Sheets

FIREWALLING COMMUNICATION PORTS IN A MULTI-PORT SYSTEM

TECHNICAL FIELD

This disclosure relates to integrated circuits (ICs) and, more particularly, to firewalling communication ports in a multi-port system disposed in an IC.

BACKGROUND

Modern computing environments may include a plurality of different host data processing systems (host systems) and one or more peripheral devices. One or more of the host systems may be virtualized. The peripheral device(s) may be shared among the various host systems. A communication bus such as a Peripheral Component Interconnect Express (PCIe) bus may be used to couple the host systems with the peripheral devices. Each different host system may be coupled to a given peripheral device via a communication port. The peripheral device may be an integrated circuit (IC) that includes one or more compute circuits therein each configured to implement one or more hardware acceleration functions. The IC often includes a Direct Memory Access (DMA) subsystem that is shared between the different host systems and the compute circuit(s) of the IC.

In the normal course of operation, one or more of the various communication ports coupling the peripheral device to a host system via a bus may undergo a conventional reset as set forth in the PCIe Base Specification. Examples of a conventional reset may include, but are not limited to, those initiated via a PERST # signal, hot resets, and link disable resets. A conventional reset may occur on any of the various ports of the PCIe bus independently. The occurrence of a conventional reset on a communication port brings down the PCIe link on that communication port such that the PCIe controller of the communication port stops sending/receiving data to/from the DMA system.

The disruption in sending/receiving data that occurs in consequence of a conventional reset may occur virtually any time including in the middle of a data transmission. This means that requests sent from compute circuits within the peripheral device using the down communication port will not be received by the intended host system. Also, responses from the host system and/or the PCIe controller of the down communication port expected by the compute circuits of the peripheral device will not be received. Data within the DMA system to be provided to the host system may backup causing the DMA system to experience a hang condition where the DMA system becomes unresponsive to received inputs and/or stops operation. The hang condition may disrupt not only communications with the host system coupled to the down communication port, but also communication across all of the communication ports to which the DMA system is coupled. With the DMA system in the hung state, a reset of the entire DMA system is needed to continue operation once the PCIe link of the down communication port is restored. That is, the DMA system may not start normal operation without a reset despite the down communication port being restored to an operational state. Resetting the DMA system further disrupts communications on the other communication ports.

SUMMARY

In one or more example implementations, a method includes monitoring, using a plurality of firewall circuits, a plurality of controllers corresponding to different communication ports for a reset condition. The plurality of controllers are coupled to a direct memory access (DMA) system through a plurality of bridge circuits. The method includes detecting, by a selected firewall circuit, a reset condition on a selected controller coupled thereto. The selected controller is coupled to a selected bridge circuit of the plurality of bridge circuits. The method includes, in response to detecting the reset condition, implementing a firewall operating mode in the selected firewall circuit. The method includes, while operating in the firewall operating mode, controlling operation of the selected bridge circuit thereby isolating the selected controller from the DMA system.

In one or more example implementations, a system includes a plurality of controllers. Each controller corresponds to a different communication port. The system includes a plurality of bridge circuits. Each bridge circuit is coupled to one controller of the plurality of controllers. The system includes a plurality of firewall circuits coupled to the plurality of bridge circuits. The system includes a direct memory access (DMA) system coupled to respective ones of the plurality of bridge circuits and to a client circuit. Each firewall circuit is configured to monitor for a reset condition on a corresponding controller of the plurality of controllers and, in response to detecting the reset condition, implement a firewall operating mode by controlling a corresponding bridge circuit of the plurality of bridge circuits that isolates the DMA system from the corresponding controller.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
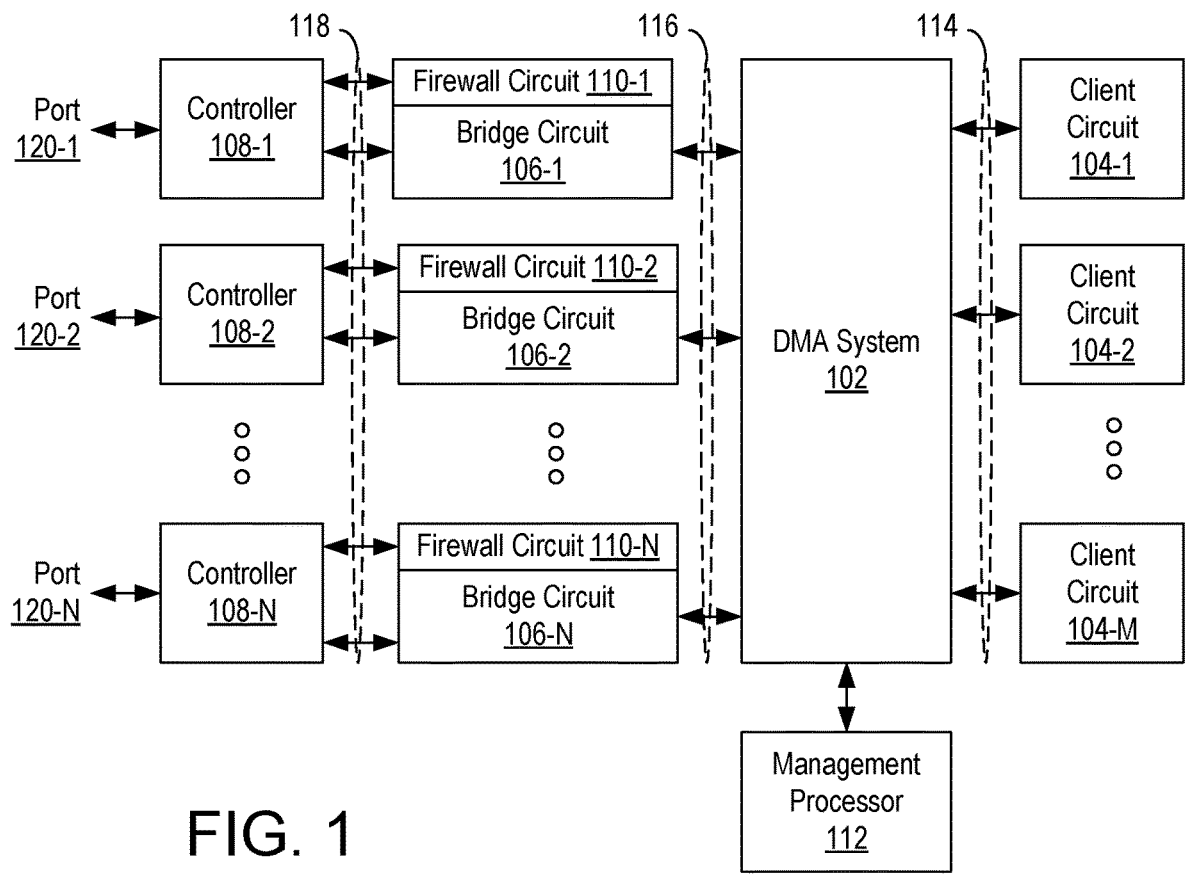
FIG. 1 illustrates an example circuit architecture for a multi-port system for use in an integrated circuit (IC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to firewalling communication ports in a multi-port system disposed in an IC. The inventive arrangements are capable of performing communication port reset handling for the multi-port system. In accordance with the inventive arrangements described within this disclosure, firewall circuitry is used to handle reset conditions on individual ports of a multi-port system. Each of the ports may be configured to include firewall circuitry within the data path (e.g., port-specific firewall circuitry). The firewall circuitry on each port of the multi-port system is capable of isolating a shared direct memory access (DMA) system in the IC from the host system on a port undergoing reset or that is otherwise inoperable.

In cases where the communication link on a given port is inoperable (e.g., "down"), the firewall circuitry of the down port is capable of responding, on behalf of the host system coupled to the down port and/or a controller coupled to the down port, to client circuits. That is, the firewall circuitry is capable of receiving DMA traffic from the client circuits coupled to the DMA system in the IC and responding to the DMA traffic on behalf of the host system and/or the controller. The firewall circuitry of the down port allows that port to undergo a reset without disrupting operation of the DMA system with respect to the down port and/or the DMA system as a whole. As such, operation of the DMA system with respect to other ports coupled thereto is not disrupted. The other ports may continue to operate unaffected by the reset occurrence on the down port.

In one or more other example implementations, the firewall circuitry of one or more selected ports may be invoked proactively, e.g., in anticipation of an expected reset event or another event. In that case, a management processor may invoke a firewall operating mode in firewall circuitry on one or more selected ports by writing to selected bits/locations of a configuration register. The management processor is capable of invoking the firewall operating mode of the firewall circuitry on a per-port basis.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example circuit architecture for a multi-port system (system) 100. System 100 may be disposed within an IC. The IC may be any of a variety of different types of ICs that may include a multi-port DMA system. Examples of such ICs can include, but are not limited to, central processing units (CPUs), graphics processing units (GPUs), System-on-Chips (SoC), programmable ICs, or an Application-Specific IC (ASIC). A programmable IC refers to an IC that includes at least some programmable logic. An example of programmable logic includes field programmable gate array (FPGA) circuitry as may be included in an FPGA type of IC. The IC including system 100 may be disposed on a circuit board, e.g., a card, that may be coupled to a plurality of host systems. The circuit board may include volatile and/or non-volatile memory coupled to the IC. The IC is an example of a peripheral device and/or a hardware accelerator.

Each of the host systems to which the IC is coupled may be implemented as a data processing system (e.g., a computer) and/or as a virtualized system (e.g., a virtual machine and/or container). In the example, each of ports 120-1, 120-2, . . . 120-N may couple to a particular, e.g., one, host system, whether physical or virtual.

As illustrated, system 100 includes a DMA system 102, a plurality of client circuits 104 (e.g., 104-1, 104-2, through 104-M), a plurality of bridge circuits 106 (e.g., 106-1, 106-2, through 106-N), a plurality of controllers 108 (e.g., 108-1, 108-2, through 108-N), and a plurality of firewall circuits 110 (e.g., 110-1, 110-2, through 110-N). Each of bridge circuits 106 illustrated in FIG. 1 is associated with a firewall circuit 110. A management processor 112 is also included and coupled to DMA system 102. Management processor 112 is capable of executing program code (e.g., firmware) to control various aspects of the operation of system 100. For example, management processor 112 is capable of reading and/or writing status registers and/or control registers of the various components illustrated in FIG. 1 (e.g., client circuits 104 and/or bridge circuits 106).

DMA system 102 includes ports that couple to client circuits 104, to bridge circuits 106, and to management processor 112. In one example, DMA system 102 is implemented as a hardened circuit block. In another example, DMA system 102 is implemented using programmable circuitry. Within this disclosure, programmable circuitry may include programmable logic. An example of programmable logic is FPGA type circuitry. DMA system 102 includes a first plurality of ports 114 that couple to respective ones of client circuits 104. DMA system 102 includes a second plurality of ports 116 that couple to respective ones of bridge circuits 106. In the example, DMA system 102 supports communication between M different client circuits 104 and N different host systems.

Each client circuit 104 may be implemented as a hardened circuit block. In another example, each client circuit 104 may be implemented using programmable circuitry. It should be appreciated that one or more of client circuits 104 may be hardened circuit blocks while one or more other ones of client circuits 104 may be implemented using programmable circuitry. Each bridge circuit 106 may be implemented as a hardened circuit block. In another example, each bridge circuit 106 may be implemented using programmable circuitry.

As shown, each bridge circuit 106 is coupled to a controller 108 by way of a respective port 118. Each controller 108 is coupled to a host system (not shown) through a respective port 120. Accordingly, system 100 is capable of conveying data between the host systems coupled to ports 120-1, 120-2, through 120-N to different ones of client circuits 104. It should be appreciated that the number of client circuits 104 need not match the number of ports 120. In one or more example implementations, each port 120 may be a PCIe port. In that case, each of controllers 108 is implemented as a PCIe controller and each of bridge circuits 106 is implemented as a PCIe bridge circuit.

While PCIe is used throughout this disclosure, it should be appreciated that PCIe is one example of a communication standard and/or bus with which the inventive arrangements may be used. The inventive arrangements are not intended to be limited for use with any one particular bus, however.

In the example, each firewall circuit 110 is capable of detecting an inoperable link on the corresponding port 120. Within this disclosure, an inoperable link may be referred to as a "down link." In this regard, the port over which the link is down or the port that is inoperable may be referred to as a "down port." An inoperable link or port means that data is not flowing from the host system to the controller 108 and is not flowing from the controller 108 to the host system.

In one aspect, each firewall circuit 110 may be coupled to the corresponding controller 108. Each firewall circuit 110 is capable of determining that the corresponding port 120 is down by communicating with the respective controller 108 coupled thereto. For example, from time-to-time, the link (e.g., the communication link or channel between a controller 108 and the connected host system) may be inoperable. In one aspect, the link may be inoperable due to a conventional reset as set forth in the PCIe Base Specification. Examples of conventional reset may include, but are not limited to, those initiated via a PERST # signal, hot resets, and link disable resets. A conventional reset may occur on any of the various ports 120-1, 120-2, through 120-N independently. In some cases, the interface of the controller 108 is also in a frozen or "stuck" state and, as such, unresponsive to DMA data from client circuits 104. Each firewall circuit 110 may detect such states in the interface of the corresponding controller 108.

During normal operation while the link for a given port is up (e.g., operating), each firewall circuit 110 may operate in a pass-through or bypass mode. In this mode, firewall circuit 110 does not have any effect on data passing through bridge circuit 106. Operation or existence of firewall circuit 110 is transparent to normal operation of bridge circuit 106. In response to detecting a reset condition in which the link to the host system via the corresponding controller 108 is down, firewall circuit 110 is capable of entering a firewall operating state.

In the firewall operating state, firewall circuit 110 is capable of performing a variety of operations described herein that allow DMA system 102 to continue operating thereby avoiding a hang state that disrupts operation of the entire DMA system 102 and avoiding a reset of any part and/or the entirety of DMA system 102. Further, operation of the firewall circuits 110 reduces the number of special cases that client circuits 104 must accommodate. That is, firewall circuits 110 may provide any data expected by client circuits 104 to such circuits along with an error indicator. This means that client circuits 104 need not be designed to handle different situations where the amount of data that is received by the client circuit 104 is less than or different from the amount of data that is expected by client circuits 104 from DMA system 102. Firewall circuits 110, while operating in the firewall operating mode, are capable of acting on behalf of the "host system partner," in reference to the host system coupled to the down port 120, to provide data as expected by the respective client circuit(s) 104. The data may be dummy data, but be provided in an amount expected by the respective client circuit(s) 104. As noted, the data provided from firewall circuit 110 may include an error indicator.

For example, in response to detecting a reset condition, where the phrase "reset condition" refers to a conventional reset or other condition causing a down link or down port 120, firewall circuit 110 enters the firewall operating state. In the firewall operating state, firewall circuits 110 handle detected reset conditions on the respective ports automatically. A firewall circuit 110, in response to detecting the reset condition, is capable of generating an interrupt to management processor 112. In general, the firewall circuit 110 is capable of unsticking the interface for DMA system 102 and also operating as an "infinite" data sink for requests and completions that may be received from client circuits 104. The firewall circuit 110 also is capable of walking through outstanding requests to the host system partner coupled to the down port and completing the outstanding requests (e.g., internally) with an error status. In this manner, firewall circuit 110 acts on behalf of the host system partner coupled to the down port and/or controller 108 of the down port. The firewall circuit 110 is capable of providing any necessary response data to client circuits 104. In addition, firewall circuits 110 are capable of providing any hooks for idle detection so that the host system partner can re-enable the port 120 (e.g., a PCIe port) for a new incarnation (established or re-established link on the reset port).

In one or more other example implementations, the firewall circuit 110 of one or more selected ports 120 may be invoked proactively, e.g., in anticipation of an expected reset event or another event. In that case, management processor 112 may invoke a firewall operating mode in the firewall circuit 110 of one or more selected ports 120 by writing to selected bits/locations of a configuration register of the firewall circuit 110. The management processor 112 is capable of invoking the firewall operating mode of the firewall circuitry on a per-port basis. For purposes of discussion, a firewall invocation event may refer to the detection of a reset condition on a port as described herein and/or the management processor 112 writing data to a configuration register of a firewall circuit 110 to invoke the firewall operating mode therein proactively.

Figure 2:
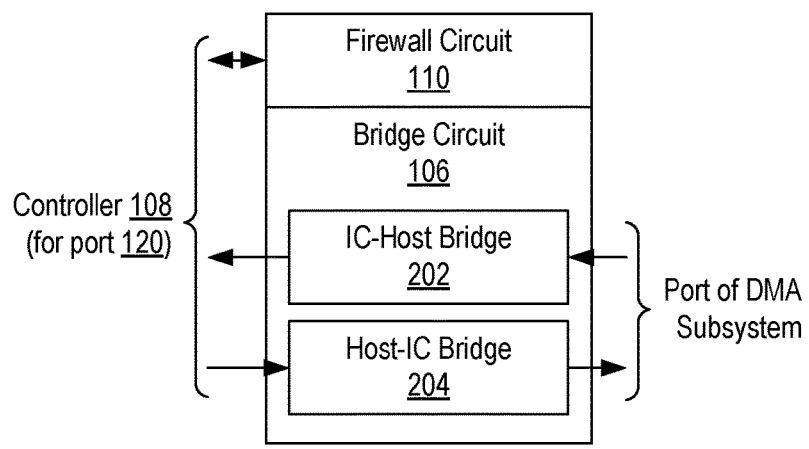
FIG. 2 illustrates an example implementation of a bridge circuit and a firewall circuit.

FIG. 2 illustrates an example implementation of a bridge circuit 106 and a firewall circuit 110 of FIG. 1. In the example, bridge circuit 106 includes an IC-host bridge 202 and a host-IC bridge 204. IC-host bridge 202 is configured to translate packets of data formatted using an internal communication protocol and/or syntax to a format compliant with the particular communication protocol and/or syntax used by controller 108 and port 120. For purposes of illustration, IC-host bridge 202 may convert Advanced Microcontroller Bus Architecture (AMBA) extensible Interface (AXI) protocol formatted data to PCIe formatted data (e.g., transaction layer packets or TLPs). Host-IC bridge 204 is configured to translate packets of data formatted using the particular communication protocol and/or syntax used by controller 108 and port 120 to the internal communication protocol and/or syntax. Continuing with the prior example, host-IC bridge 204 may convert PCIe formatted data (e.g., TLPs) to AXI protocol formatted data.

During normal operation, e.g., while the corresponding port 120 is up, firewall circuit 110 does not interfere with operation of bridge circuit 106. In response to detecting that the corresponding port 120 is down, firewall circuit 110 may enter the firewall operating mode and control and/or direct one or more operations of bridge circuit 106 as described herein in greater detail below.

Figure 3:
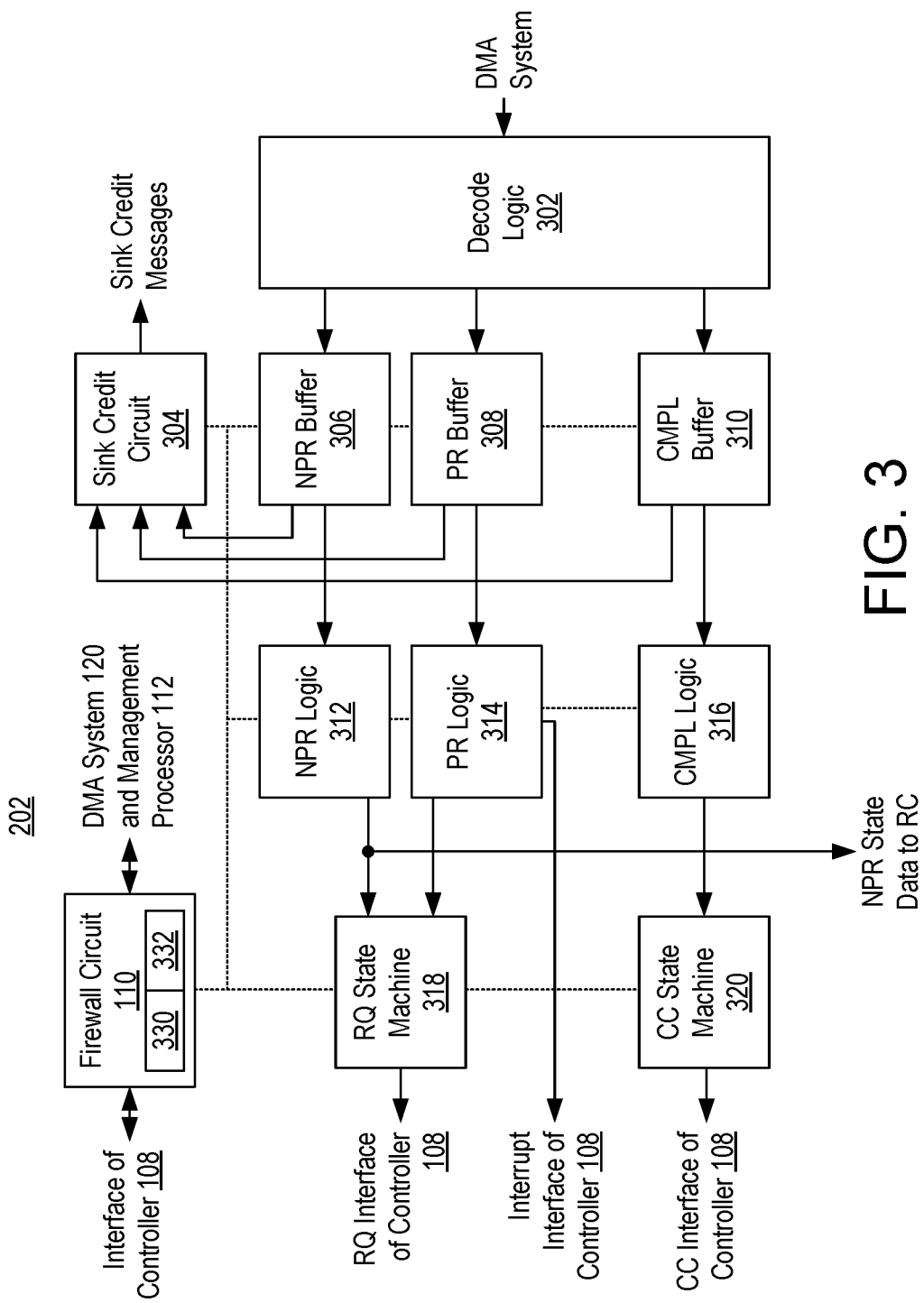
FIG. 3 illustrates an example implementation of an IC-host bridge.

FIG. 3 illustrates an example implementation of IC-host bridge 202 of FIG. 2. FIG. 3 illustrates a circuit architecture that is capable of conveying data traffic from client circuits 104 to the host system. In the context of FIG. 3, the host system is the PCIe completer and the client circuits 104 are the PCIe requestors. In the example of FIG. 3, IC-host bridge 202 includes decode logic 302, a sink credit circuit 304, a Non-Posted Request (NPR) buffer 306, a Posted Request (PR) buffer 308, a completion (CMPL) buffer 310, NPR logic 312, PR logic 314, CMPL logic 316, a request (RQ) state machine 318, and a (CC) state machine 320. In the example of FIG. 3, firewall circuit 110 includes a status register 330 and a configuration register 332. In addition, firewall circuit 110 may be coupled to the various blocks illustrated via one or more control signals shown as dashed lines. In the example of FIG. 3, firewall circuit 110 is coupled to DMA system 102 and management processor 112 to facilitate communication with the respective systems/components.

IC-host bridge 202 interfaces with the RQ interface, interrupt interface, and CC interface of controller 108. In the example, decode logic 302 receives data from the corresponding port of DMA system 102 as provided from a client circuit 104. Decode logic 302 provides the received data to either NPR buffer 306, PR buffer 308, or CMPL buffer 310 depending on the type of data received. That is, non-posted requests may be stored in NPR buffer 306, posted requests in PR buffer 308, and completions in CMPL buffer 310. NPR logic 312, PR logic 314, and CMPL logic 316 each is configured to convert the data from the respective buffers to TLPs suitable for transmission over port 120 by way of controller 108. Though not illustrated, NPR logic 312, PR logic 314, and CMPL logic 316 may implement gearbox functionality to convert data from one width to another and/or to perform one or more order checks.

In general, RQ state machine 318 is capable of issuing TLPs received from NPR logic 312 and/or PR logic 314 on the RQ interface of controller 108. Interrupt messages may be sent on an interrupt interface of controller 108. A sequence number-based ordering check also may be performed on messages conveyed over the interrupt interface. CC state machine 320 is capable of forwarding CMPL TLPs on a CC interface of controller 108. As entries in NPR buffer 306, PR buffer 308, and CMPL buffer 310 are freed, sink credit circuit 304 is capable of generating credit messages to DMA system 102 via a sink credit interface thereto. For NPR credits, the release of such credits also is dependent on the receipt of completions in the RC data path of FIG. 4. As shown, NPR state data is provided to the RC data path.

Figure 5:
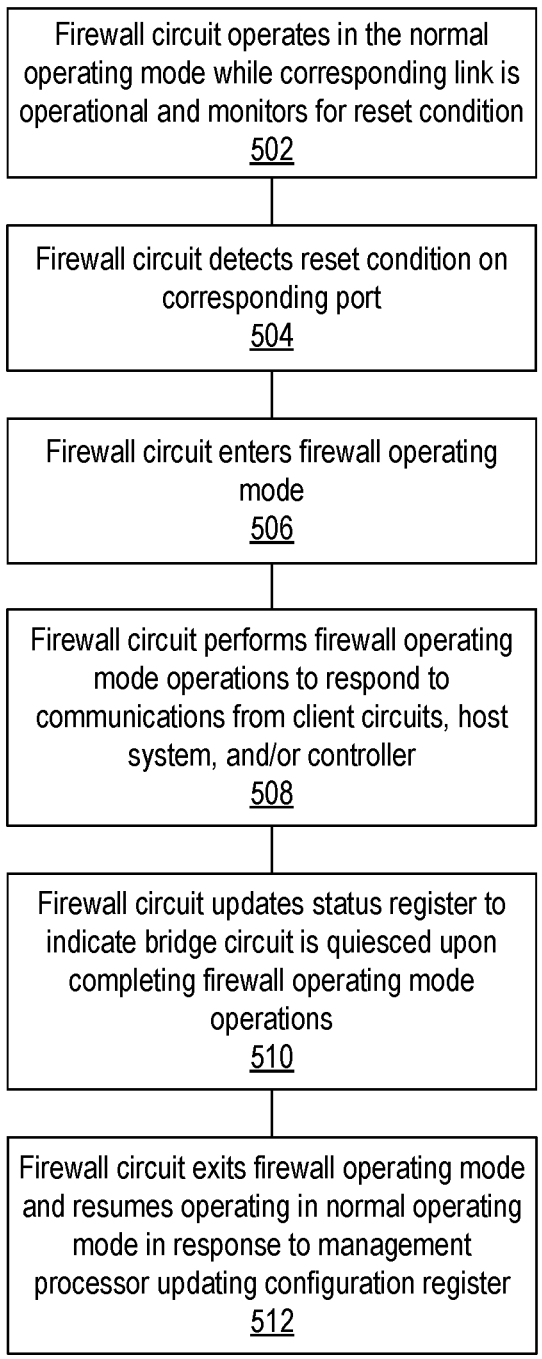
FIG. 5 illustrates an example method of operation of one or more firewall circuits within a multi-port system as described in connection with FIG. 1.

Referring to firewall circuit 110, status register 330 indicates whether firewall circuit 110 is busy. For example, while operating in the firewall operating mode, firewall circuit 110 may set status register 330 to a busy state indicating that certain operations described in greater detail in connection with FIG. 5 are being performed. In response to completing the operations such that bridge circuit 106 is in a quiescent state, e.g., that the various circuit blocks included in bridge circuit 106 (e.g., the circuit blocks of IC-Host bridge 202 and Host-IC bridge 204) are quiesced, firewall circuit 110 updates status register 330 to specify idle or quiesced.

Configuration register 332 may include a plurality of configuration bits. For example, configuration register 332 may include a firewall operating mode activation bit and a config space enable CSR (configuration space register) bit. The firewall operating mode activation bit is set while the firewall circuit operates in the firewall operating mode. In one aspect, the firewall operating mode activation bit is set by the firewall circuit 110 itself in response to detecting a reset condition on the corresponding port 120 and entering the firewall operating mode. In another aspect, management processor 112 may set the firewall operating mode activation bit to force the firewall circuit 110 to enter the firewall operating mode (e.g., proactively without first detecting a reset condition on the corresponding port). The particular conditions under which management processor 112 proactively sets the firewall operating mode activation bit may depend on the particular firmware executed by the management processor 112. In one or more example implementations, the firewall operating mode activation bit may be used to signal firewall circuit 110 that it may exit the firewall operating mode and enter the normal operating mode. For example, only in response to the firewall operating mode activation bit being cleared may the firewall circuit 110 exit the firewall operating mode and enter the normal operating mode.

The config space enable CSR bit may be tied to the config space enable of a controller 108. In this regard, the config space enable CSR bit may indicate to the controller 108 to respond to a config request from the host system with a Configuration Request Retry Status (CRS) to prevent enumeration from occurring. For example, for a port to be enumerated and begin operating normally, both the firewall operating mode activation bit and the config space enable CSR bit must be set appropriately. For instance, the firewall operating mode activation bit would be cleared and the config space enable CSR bit would be set to allow enumeration. In one or more examples, in response to the firewall operating mode being enabled or active, the config space enable CSR bit is cleared (e.g., by management processor 112) to disable enumeration of the port. The config space enable CSR bit is re-enabled or set later as described hereinbelow.

Figure 4:
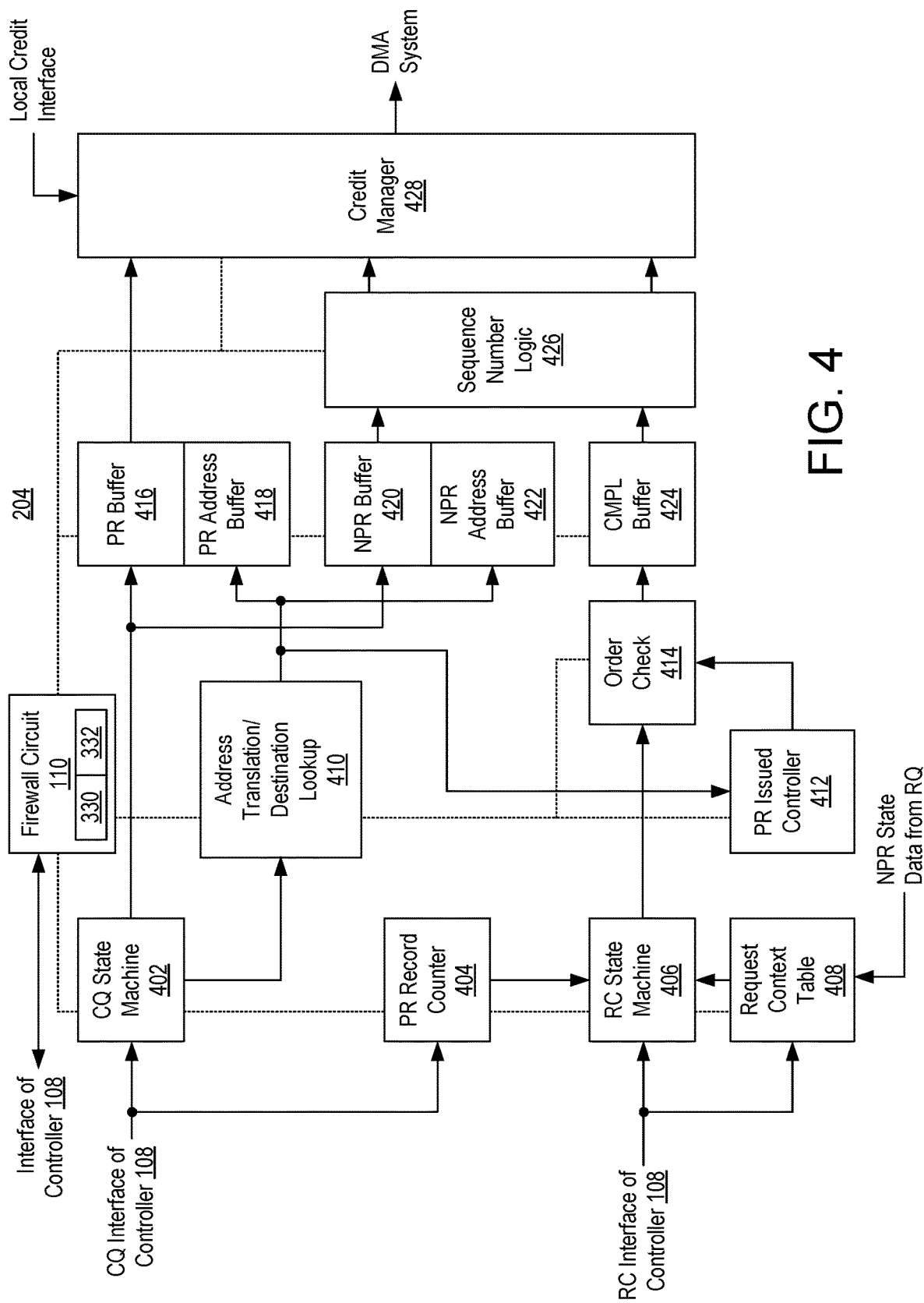
FIG. 4 illustrates an example implementation of a host-IC bridge.

In the example of FIG. 3 described above, it should be appreciated that the completions described are for, e.g., correspond to, non-posted requests from the host system illustrated in FIG. 4. Similarly, with respect to FIG. 4 as described below, the completions described are for, e.g., correspond to, non-posted requests from the client circuits 104 in FIG. 3. A posted request (PR) is a request from an entity, e.g., a circuit and/or system, for which a completion (notification/response) is not required. A non-posted request (NPR) is a request from an entity, e.g., a circuit and/or system, for which a completion (notification/response) is required.

FIG. 4 illustrates an example implementation of Host-IC bridge 204 of FIG. 2. FIG. 4 illustrates a circuit architecture configured to convey data traffic from the host system to client circuits 104. In the context of FIG. 4, the host system is the PCIe requestor and the client circuits 104 are the PCIe completers. In the example of FIG. 4, host-IC bridge 204 includes CQ state machine 402, PR record counter 404, RC state machine 406, request context table 408, address translation/destination lookup 410, PR issued controller 412, order check 414, PR buffer 416, PR address buffer 418, NPR buffer 420, NPR address buffer 422, CMPL buffer 424, sequence number logic 426, and credit manager 428. In the example of FIG. 4, firewall circuit 110 may be coupled to the various blocks illustrated via one or more control signals shown as dashed lines. In the example of FIG. 4, the signals from firewall circuit 110 and DMA system 102 and management processor 112 are not shown.

Host-IC bridge 204 interfaces with the CQ and RC interfaces of controller 108. In the example, CQ state machine 402 receives PR TLPs and NPR TLPs via the CQ interface of controller 108. CQ state machine 402 is capable of translating NPR TLPs and PR TLPs into the internal data format used within the IC including system 100 (e.g., AXI data). CQ state machine 402 stores the translated packetized data corresponding to NPR TLPs in NPR buffer 420 and the translated packetized data corresponding to PR TLPs in PR buffer 416.

CQ state machine 402 uses address translation/destination lookup 410 to perform address translations for memory, input-output (I/O), and/or atomic requests. Message requests may also be processed by address translation/destination lookup 410. Results from address translation/destination lookup 410 are stored in separate address buffers. For example, addresses for translated PR TLPs are stored in PR address buffer 418 while addresses for translated NPR TLPs are stored in NPR address buffer 422.

Outputs from PR buffer 416 and NPR buffer 420 may be combined in credit manager 428. As shown, outputs from NPR buffer 420 and CMPL buffer 424 are processed through sequence number logic 426. Credit manager 428 is capable of tracking credits associated with each destination (e.g., client circuit 104) and, in one example, forwards data onward only if enough credits are available for the target client circuit to send an entire packet.

RC state machine 406 receives CMPL TLPs via the RC interface of controller 108. In this example, a PCIe tag received via the RC interface of controller 108 is used to look up an internally used tag corresponding to the PCIe tag in request context table 408. As shown, NPR state data from the RQ data path illustrated in FIG. 3 is provided to request context table 408. RC state machine 406 is capable of converting the CMPL TLPs into the internally used data packet format. Order check 414 is capable of performing an ordering check on the translated CMPL TLPs to ensure that the CMPL cannot pass an earlier issued PR. Translated CMPL TLPs are stored in CMPL buffer 424 and then provided to credit manager 428 by way of sequence number logic 426.

As illustrated, credit manager 428 may output data. Though not illustrated, further circuitry may be coupled to the output(s) of credit manager 428 such as arbitration logic and/or gearbox circuitry that may further process data output from credit manager 428.

In the examples of FIGS. 3 and 4, upon entering the firewall operating mode, firewall circuit 110 is capable of controlling operation of the various circuit blocks of IC-Host bridge 202 and Host-IC bridge 204 by virtue of providing commands or instructions to the respective circuit blocks via the control signals illustrated. In one or more example implementations, firewall circuit 110 includes a state machine in addition to the registers shown. Operation of the state machine in the firewall operating mode causes firewall circuit 110 to control the various components of bridge circuit 106 to perform the operations described herein with respect to the firewall operating mode.

FIG. 5 illustrates an example method 500 of operation of firewall circuits 110 within a multi-port system (e.g., system 100). As noted, within system 100, DMA system 102 is shared between the IC in which DMA system 102 is disposed and among the multiple host systems coupled via ports 120. Method 500 is described with respect to a particular firewall circuit 110-1. It should be appreciated that the method described in connection with firewall circuit 110-1 may be performed by any of the firewall circuits 110 and may be performed independently of the other firewall circuits 110 based on whether the respective port corresponding to a given firewall circuit 110 is undergoing a reset condition. In this regard, the process described in the example of FIG. 5 may be performed by one or more firewall circuits 110 asynchronously, in parallel, etc. in response to detecting a reset condition on the respective port 120.

In block 502, firewall circuit 110-1 operates in the normal operating mode while the link over port 120-1 is operational. For example, while in the normal operating mode, data exchanged between the corresponding controller 108-1 and DMA system 102 flows unaffected. In the normal operating mode, the link established by controller 108-1 over port 120-1 is operational such that data may be received from the host system partner coupled to port 120-1 and data may be sent to the host system partner.

In block 504, firewall circuit 110-1 detects a reset condition on port 120-1. For example, firewall circuit 110-1 is capable of detecting a reset condition by determining, based on the state of one or more of the interfaces of controller 108-1, that controller 108-1 is in reset. As an illustrative example, one or more or all of the various interfaces of controller 108-1 may be frozen or stuck. The reset condition indicates that the link on port 120-1 is down such that no data is flowing over port 120-1 between the host system and controller 108-1. The reset condition may be a conventional reset in the case of a PCIe link. For example, the reset condition may be a PERST # signal, a hot reset, or a link disable.

While controller 108-1 is experiencing the reset condition, controller 108-1 stops sending TLPs to DMA system 102 and stops receiving TLPs (e.g., as formatted by bridge circuit 106-1) that originate from DMA system 102 (e.g., the client circuits 104 coupled to DMA system 102). The stoppage of data may occur in the middle of TLP transmission. Prior requests from client circuit(s) 104 may not have received all expected completions. Client circuits 104, however, may operate in a manner that expects all data to be received. Any completions received by bridge circuit 106-1 for prior requests issued cannot be sent over port 120-1 since controller 108-1 does not accept any TLPs while in reset (e.g., while link 120-1 is down).

In block 506, in response to detecting the reset condition, firewall circuit 110-1 enters the firewall operating mode. For example, in response to entering the firewall operating mode, firewall circuit 110-1 is capable of performing one or more operations. The operations may include reporting to DMA system 102 that the link on port 120-1 is down. The operations also may include sending an interrupt to management processor 112 indicating that the link on port 120-1 is down. The operations also may include updating status register 330 to indicate that bridge circuit 106-1 is in a busy state and/or setting the firewall operating mode activation bit in configuration register 332.

In one aspect, while any blocks of bridge circuit 106-1 (e.g., as illustrated and described in connection with FIGS. 2, 3, and 4) have any pending requests, status register 330 of firewall circuit 110-1 continues to indicate a busy state. Firewall circuit 110-1 is capable of clearing the busy status of status register 330 in response to all of the pending requests of bridge circuit 106-1 being flushed from bridge circuit 106-1.

In block 508, firewall circuit 110-1 performs one or more firewall operating mode operations. The firewall operating mode operations may include responding to communications from client circuits 104 on behalf of controller 108-1 and/or the host system partner and/or responding to communications from controller 108-1 and/or the host system partner. Firewall circuit 110-1 drains any pending requests within bridge circuit 106-1. Any pending requests to controller 108-1, for example, are drained. Further, internal credits on the various interfaces described may be returned to an initial state.

The following is a discussion of the various operations performed to drain pending requests from bridge circuit 106-1 while firewall circuit 110-1 is operating in the firewall operating mode. For purposes of illustration, the discussion is separated into those operations performed in response to client circuit 104 communications (e.g., requests received via DMA system 102 from client circuits 104) and those operations performed in response to host system and/or controller communications.

In one or more example implementations, operations performed in response to client circuit 104 communications include:

- All PR requests received from client circuits 104 are dropped. For example, those PR requests processed by PR logic 314 are dropped and those stored in PR buffer 308 are purged.
- All NPR requests from client circuits 104 are completed with an error status. The completed NPR requests include all bytes of data expected by the respective client circuits 104. For example, for each outstanding request, completions (e.g., responses) are generated to the appropriate client circuits 104 with an error status and dummy payload data. The dummy payload data will have the amount of data expected by the respective client circuits 104. For example, NPR logic 312 and RC state machine 406 may operate cooperatively to perform this operation. NPR logic 312 may receive requests and communicate with RC state machine 406 causing it to respond and generate the necessary dummy payload data in the generated response.
- All Interrupt requests are dropped by PR logic 314. Any pending interrupt request on the interface will be completed internally within firewall circuit 110.
- All Enhanced Configuration Access Mechanism (ECAM) transactions in the firewall operating mode are completed with an error completion indicator. For example, NPR logic 312 and RQ state machine 318 may operate cooperatively to complete the ECAM transactions with the error completion indicator. ECAM, as defined in the PCIe specification, is a method for a root complex to access the configuration space of a local bus and bus endpoints.
- Any partial completion TLP that was streaming as the link went down is detected and handled. This operation relates to completion data received from the host system by RC state machine 406. RC state machine 406 is capable of detecting a partial TLP and, in response thereto, terminating or dropping the partial TLP without forwarding the partial TLP to the client circuit 104.
- All credits are returned to the respective client interfaces (e.g., the interfaces will be reset). For example, sink credit circuit 304 issues the necessary credit to reset the various interfaces of DMA system 102 for the client circuits 104.
- All internal PCIe Flow Control (FC) limit credits are returned to their initial value(s). For example, NPR logic 312 may initiate and/or perform this operation.
- All header and data metering credits are returned to their initial value(s). For example, NPR logic 312 may initiate and/or perform this operation.
- All tags, e.g., as tracked by request context table 408, are released and returned to their initial state.

In one or more example implementations, operations performed in response to host system and/or controller communications include:

- Any pending NPR TLPs in NPR buffer 420 are dropped.
- Full PRs that are present in PR buffer 416 are sent to client circuits 104.
- Any partial PR TLPs present in PR buffer 420 will be drained (e.g., dropped).
- Completions received from the client circuits 104 for all the pending NPRs will be dropped at the output, e.g., dropped by CMPL logic 316.
- All tags are returned to their initial value(s). Firewall circuit 110 may perform this operation.
- All interface credits are reset to their initial value(s). For example, firewall circuit 110 may operate in coordination with PR record counter 404 and PR issued controller 412 to perform this operation.

In the foregoing examples, though firewall circuit 110 may not be specifically enumerated in each operation, it should be appreciated that the various components mentioned may operate under control of, or responsive to commands from, firewall circuit 110 while operating in the firewall operating mode.

In the example, by performing the various firewall operating mode operations described herein in connection with block 508, firewall circuit 110-1 isolates controller 108-1 from DMA system 102. That is, because DMA system 102 is effectively interacting with firewall circuit 110-1 in lieu of controller 108-1, which may be in a frozen state, DMA system 102 is unaware of the down link. DMA system 102 may continue to pass through and/or process data exchanged between firewall circuit 110-1 and the various client circuits 104.

In block 510, once the operations described in connection with block 508 have completed and the various circuit blocks of bridge circuit 106-1 are quiesced, the firewall circuit 110-1 updates status register 330 to indicate that bridge circuit 106-1 is quiesced (e.g., no longer busy). For example, while firewall circuit 110-1 operates in the firewall operating mode, e.g., in response to the interrupt generated upon entering the firewall operating mode, management processor 112 is capable of polling status register 330 for status information. Management processor 112 may execute firmware that polls the busy status to determine when all of the circuit blocks of bridge circuit 106 are quiesced.

In response to management processor 112 determining that the blocks of bridge circuit 106-1 are quiesced, e.g., based on polling status register 330, management processor clears the firewall operating mode activation bit in configuration register 332 to indicate to firewall circuit 110-1 that firewall circuit 110-1 may exit the firewall operating mode and resume operation in the normal operating mode. In the examples described herein, firewall circuit 110-1 is unable to exit the firewall operating mode under its own initiative. Rather, only after indicating that the bridge circuit 106-1 is quiesced (e.g., by way of status register 330) and in response to management processor 112 updating configuration register 332 as described may firewall circuit 110-1 exit the firewall operating mode.

Accordingly, in block 512, firewall circuit 110-1 exits firewall operating mode and resumes operating in normal operating mode in response to management processor 112 clearing the firewall operating mode activation bit of configuration register 332, which may be construed as an instruction or command from management processor 112 provided to firewall circuit 110-1 to exit the firewall operating mode. Once controller 108-1 is out of reset, the link on port 120-1 will come back up and enumeration may occur.

In one or more example implementations, management processor 112 may delay firewall circuits 110 exiting the firewall operating mode. For example, while firewall circuit 110-1 is quiescing bridge circuit 106-1, management processor 112 may need to reset one or more of client circuits 104. The resetting of client circuits 104 may be required by management processor 112 since client circuits 104 may not be configured to perform such functions. In cases where management processor 112 requires more time, e.g., the resetting of the client circuit(s) 104 is not yet complete, management processor 112 may extend the time that firewall circuit 110-1 remains in the firewall operating mode by delaying the clearing of the firewall operating mode activation bit and/or the setting of the config space enable CSR bit of configuration register 332.

This aspect of management processor 112 operation can be used to indicate to the host system when IC 100 is ready after a reset through a PCIe-spec compliant mechanism, e.g., Config Retry Status. This feature may be used to handle cases wherein the PCIe link comes up quickly, e.g., before the firewall operating mode is disabled and/or before bridge circuit 106-1 is fully quiesced (which also entails that any client circuits 104 communicating through bridge circuit 106-1 are quiesced and/or reset). A typical flow would entail the firewall operating state activation bit of configuration register 332 being set, whether by firewall circuit 110-1 in response to detecting a reset condition or by management processor 112 proactively to initiate the firewall operating mode, followed by the firewall operating mode completing operation (e.g., clearing the firewall operating mode activation bit), and, after the client circuits 104 are ready, the management processor 112 setting the config space enable CSR bit thereby allowing the corresponding port to be enumerated by the host system and a link to be established on the port. In general, while the firewall operating mode activation bit indicates the mode of operation of the firewall circuit 110-1, the config space enable CSR bit controls whether the port may be enumerated so that a link may be established.

In another example implementation, the management processor 112 is capable of setting the config space enable CSR bit to allow the corresponding port to be enumerated and brought back up while the firewall operating mode activation bit remains set. In that case the link may be brought back up over the port while the bridge circuit and any client circuits communicating using the bridge circuit (e.g., the data path) continue to be quiesced. Upon the bridge circuit and the client circuit(s) being quiesced, the management processor 112 may clear the firewall operating mode activation bit.

It should be appreciated that the different examples described herein relating to usage of configuration register 332 are provided for purposes of illustration and not limitation. The particular manner in which bits are set and/or cleared in configuration register 332 may vary based on the operating context of system 100 and/or the firmware executed by management processor 112.

In one or more other example implementations, as discussed, management processor 112 may write to configuration register 332 (e.g., set the firewall operating mode activation bit) of one or more selected firewall circuits 110 to invoke the firewall operating mode in the respective circuits. In that case, management processor 112 invokes the firewall operating mode for one or more selected ports prior to the detection of a reset condition on such ports. In such cases, the firewall operating mode is implemented by the firewall circuits 110 that are so configured for the corresponding ports. The various operations described herein and in connection with FIG. 5 may be performed for each respective port.

Figure 6:
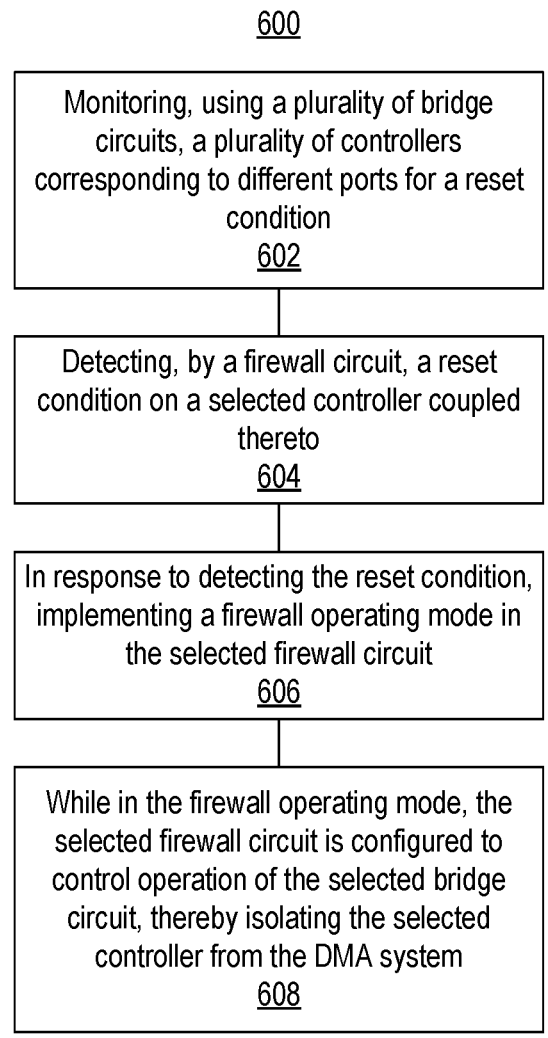
FIG. 6 illustrates another example method of operation of one or more firewall circuits within a multi-port system as described in connection with FIG. 1.

FIG. 6 illustrates another example method 600 of operation of firewall circuits 110 within a multi-port system (e.g., system 100).

In block 602, the bridge circuits monitor a plurality of controllers 108 corresponding to different communication ports for a reset condition. The firewall circuits 110 monitor corresponding controllers 108 for the reset condition(s). As discussed, the plurality of controllers 108 are coupled to DMA system 102 through a plurality of bridge circuits 106.

In block 604, a selected firewall circuit 110-1 detects a reset condition on a selected controller 108-1 coupled thereto (e.g., coupled to the selected firewall circuit 110-1). The selected controller 108-1 is coupled to the selected bridge circuit 106-1. In block 606, in response to detecting the reset condition, the selected firewall circuit 110-1 implements a firewall operating mode. In block 608, while operating in the firewall operating mode, the selected firewall circuit 110-1 is configured to control operation of the selected bridge circuit 106-1, thereby isolating the selected controller 108-1 from the DMA system 102.

For example, the selected firewall circuit 110-1 is capable of causing the selected bridge circuit 106-1 to generate a response (e.g., a completion) to a client circuit 104 on behalf of a host system coupled to the selected controller 108-1. The response (e.g., completion) may be generated responsive to a dropped non-posted request. In some aspects, an indication of an error is included within the response. In some aspects, the method includes padding the response with dummy data such that the response includes an amount of data expected by the client circuit. As discussed, RC state machine 406 operating in coordination with NPR logic 312 are capable of performing these operations.

In some aspects, the firewall operating mode is invoked in one or more firewall circuits (e.g., a different firewall circuit corresponding to a different communication port) in response to a command to implement the firewall operating mode for the respective firewall circuit(s).

In some aspects, the selected firewall circuit 110-1 is capable of causing the selected bridge circuit 106-1 to discard a newly received request from a client circuit 104. For example, NPR logic 312 and NPR buffer 306 may discard received NPR requests. PR logic 314 and PR buffer 308 may discard received PR requests.

In some aspects, the selected firewall circuit 110-1 is capable of causing the selected bridge circuit 106-1 to discard an interrupt message received from a client circuit 104. For example, PR logic 314 is capable of performing this operation.

In some aspects, the firewall circuit is capable of quiescing the selected bridge circuit while a port corresponding to the selected controller is enumerated. Further, while the selected bridge circuit is quiesced, a link may be established on the port.

In some aspects, the selected firewall circuit 110-1 is capable of generating an interrupt to a management processor 112 and updating a status register 330 of the selected firewall circuit 110-1 to indicate a busy status. In some aspects, the method includes the management processor 112 resetting a client circuit 104 responsive to the interrupt.

In some aspects, the method includes the selected firewall circuit 110-1 exiting the firewall operating mode only in response to the selected bridge circuit 106-1 being quiesced and the selected firewall circuit 110-1 receiving an instruction from the management processor 112 to exit the firewall operating mode.

In some aspects, the management processor 112 extends an amount of time that the selected firewall circuit 110-1 remains in the firewall operating mode. For example, management processor 112 may delay the clearing of the firewall operating mode activation bit (e.g., delay the termination of the firewall operating mode) and/or delay the setting of the config space enable CSR bit (e.g., delay enumeration of the port).

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    monitoring, using a plurality of firewall circuits, a plurality of controllers corresponding to different communication ports for a reset condition, wherein the plurality of controllers are coupled to a direct memory access (DMA) system through a plurality of bridge circuits;
    detecting, by a selected firewall circuit, a reset condition on a selected controller coupled thereto, wherein the selected controller is coupled to a selected bridge circuit of the plurality of bridge circuits;
    in response to detecting the reset condition, implementing a firewall operating mode in the selected firewall circuit; and
    while operating in the firewall operating mode, controlling operation of the selected bridge circuit thereby isolating the selected controller from the DMA system.

2. The method of claim 1, wherein the firewall operating mode is invoked in a different firewall circuit in response to a command to implement the firewall operating mode for the different firewall circuit.

3. The method of claim 1, wherein the isolating the selected controller from the DMA system comprises:
    the selected firewall circuit causing the selected bridge circuit to generate a completion to a client circuit on behalf of a host system coupled to the selected controller responsive to a dropped non-posted request.

4. The method of claim 3, further comprising:
including an indication of an error within the completion.

5. The method of claim 3, further comprising:
padding the completion with dummy data such that the completion includes an amount of data expected by the client circuit.

6. The method of claim 1, wherein the isolating the selected controller from the DMA system comprises:
discarding a newly received request from a client circuit.

7. The method of claim 1, wherein the isolating the selected controller from the DMA system comprises:
discarding an interrupt message received from a client circuit.

8. The method of claim 1, wherein the implementing the firewall operating mode comprises:
generating an interrupt to a management processor; and
updating a status register of the selected firewall circuit to indicate a busy status.

9. The method of claim 8, further comprising:
quiescing the selected bridge circuit while a port corresponding to the selected controller is enumerated and a link is established on the port.

10. The method of claim 8, further comprising:
exiting the firewall operating mode only in response to the selected bridge circuit being quiesced and the selected firewall circuit receiving an instruction from the management processor to exit the firewall operating mode.

11. The method of claim 10, wherein the management processor extends an amount of time that the selected firewall circuit remains in the firewall operating mode.

12. A system, comprising:
a plurality of controllers, wherein each controller corresponds to a different communication port;
a plurality of bridge circuits, wherein each bridge circuit is coupled to one controller of the plurality of controllers;
a plurality of firewall circuits coupled to the plurality of bridge circuits; and
a direct memory access (DMA) system coupled to respective ones of the plurality of bridge circuits and to a client circuit;
wherein each firewall circuit is configured to monitor for a reset condition on a corresponding controller of the plurality of controllers and, in response to detecting the reset condition, implement a firewall operating mode by controlling a corresponding bridge circuit of the plurality of bridge circuits that isolates the DMA system from the corresponding controller.

13. The system of claim 12, wherein the firewall operating mode is invoked in a different firewall circuit in response to a command to implement the firewall operating mode for the different firewall circuit.

14. The system of claim 12, wherein each firewall circuit is configured to isolate the corresponding controller from the DMA system by causing the bridge circuit to generate a completion to the client circuit on behalf of a host system coupled to the corresponding controller in response to a dropped non-posted request.

15. The system of claim 14, wherein each firewall circuit is configured to cause the corresponding bridge circuit to include an indication of an error within the completion.

16. The system of claim 14, wherein each firewall circuit is configured to cause the corresponding bridge circuit to pad the completion with dummy data such that the completion includes an amount of data expected by the client circuit.

17. The system of claim 12, wherein the firewall circuit is configured to isolate the corresponding controller from the DMA system by causing the corresponding bridge circuit to discard a newly received request from the client circuit.

18. The system of claim 14, wherein the firewall circuit is configured to isolate the corresponding controller from the DMA system by causing the corresponding bridge circuit to discard an interrupt message received from the client circuit.

19. The system of claim 12, wherein the firewall circuit is configured to implement the firewall operating mode by generating an interrupt to a management processor and updating a status register to indicate a busy status.

20. The system of claim 19, wherein:
the firewall circuit is configured to exit the firewall operating mode only in response to quiescing the corresponding bridge circuit and receiving an instruction from the management processor to exit the firewall operating mode.

* * * * *